US005895890A

United States Patent [19]

Uchiyama et al.

[11] Patent Number: 5,895,890

[45] Date of Patent: *Apr. 20, 1999

[54] BOOT AND METHOD OF INSULATING AND WATERPROOFING ELECTRICAL WIRE ENDS

[75] Inventors: Kenichi Uchiyama; Masashi Sugiyama, both of Yokkaichi, Japan

[73] Assignee: Sumitomo Wiring Systems, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,663

[22] Filed: Sep. 23, 1996

[51] Int. Cl.$^{6}$ .................................................. H02G 15/04

[52] U.S. Cl. ...................... 174/77 R; 174/74 R; 174/93

[58] Field of Search .................................. 174/77 R, 87, 174/76, 82, 74 R, 74 A, 84 C, 84 R

[56] References Cited

U.S. PATENT DOCUMENTS

| | | | |
|---|---|---|---|
| 2,870,239 | 1/1959 | Ustin | 174/87 |
| 3,550,765 | 12/1970 | Anderson | 174/138 F |
| 3,597,528 | 8/1971 | Penfield | 174/87 |
| 3,768,941 | 10/1973 | D'Ascoli et al. | 425/112 |
| 4,332,975 | 6/1982 | Dienes | 174/76 |
| 4,350,841 | 9/1982 | Scott | 174/87 |
| 4,751,350 | 6/1988 | Eaton | 174/87 |
| 4,799,899 | 1/1989 | Endo | 439/502 |
| 4,814,028 | 3/1989 | Sawaki et al. | 156/48 |
| 5,331,113 | 7/1994 | Soni et al. | 174/87 |
| 5,397,858 | 3/1995 | Delalle | 174/87 |

FOREIGN PATENT DOCUMENTS

| | | |
|---|---|---|
| 8-78066 | 3/1996 | Japan . |
| 346267 | 6/1960 | Switzerland . |

*Primary Examiner*—Kristine Kincaid
*Assistant Examiner*—William H Mayo, III
*Attorney, Agent, or Firm*—Banner & Witcoff, Ltd.

[57] ABSTRACT

A boot 23*a* for insulating the bare end of an insulated electrical wire includes a neck 25 to hold a wire or wires 21*a* centrally in the boot. The boot is filled with a solidifiable liquid substance 24, such as epoxy resin, to encapsulate the wire or wires after insertion. The boot may be transparent and include depth markings 26, 27 to determine the minimum insertion depth of the wire or wires 21*a* and the minimum level of substance.

4 Claims, 2 Drawing Sheets

BOOT AND METHOD OF INSULATING AND WATERPROOFING ELECTRICAL WIRE ENDS

FIELD OF THE INVENTION

This invention relates to a boot for insulating and waterproofing the bare ends of electrical wires. The invention also concerns a method of insulating and waterproofing the ends of electrical wires.

BACKGROUND OF THE INVENTION

Insulated electrical wire usually comprises a conductive core and a sheath of insulating material. The bare ends of wires are insulated in the appliance to which they are attached, or by a separate insulator. Separate insulators can be expensive.

In manufacture of a wiring harness it may be necessary to join several wires. This may be accomplished by using connector devices but a more reliable connection can be made by joining the conductive cores by soldering or welding, and applying an insulating boot. In conditions where moisture or corrosion is likely it is important that the boot is sealed.

Bared ends of insulated wires may be capped by a boot containing fluid substance which is solidified after the boot is fitted. Such an arrangement is disclosed for example in U.S. Pat. No. 3,550,765, and encapsulates the bare wire ends.

However this kind of boot may be unreliable in wet or corrosive conditions if the insulated wires lie against the wall of the boot, thus preventing the fluid substance encircling the wires. U.S. Pat. No. 3,597,528 discloses a cover to centralize wires in the boot, but this additional component increases cost and assembly time.

Problems may also arise with this kind of boot if the bare wire is not sufficiently inserted in the fluid substance, thus leading to insufficient depth of insulation. Further problems arise if the depth of insertion in the boot is correct but the amount of fluid substance is insufficient, or if external pressure results in insufficient encapsulation of the bared wire end.

SUMMARY OF THE INVENTION

The present invention seeks to overcome these problems and provide a boot which is inexpensive and reliable.

According to one aspect of the invention there is provided a boot for insulating a bare end of an insulated wire, the boot being adapted to receive a fluid substance into which the bare end of the insulated wire is encapsulated in use and comprising an elongate tubular sheath closed at one end and having an opening at the other end, the boot having a neck intermediate the ends defining a narrowed internal diameter, on either side of which the internal diameter is substantially greater than that of the neck, and the neck being sized to receive said wire in use.

The neck of such a boot restricts movement of the insulated wire and ensures that the wire is maintained centrally in the boot intermediate the ends thereof. This in turn ensures that the wire is encapsulated both above and below the neck. Preferably the boot is of flexible plastics material. The neck may be defined in any suitable manner, for example by an inward depression or a plurality of inward depressions, or by outward bulges on either side of the neck. Alternatively the neck may be defined by a relatively rigid insert of the boot having outward bulges above and below a central region. Such an insert serves also to prevent deformation of the boot due to external forces and thus maintain the desired shape of the boot.

In the case of forming a neck by deformation of the side wall of the boot, it may be possible to form the neck either before or after insertion of the insulated wire.

The fluid substance is solidifiable, and may be for example an epoxy resin curable by heat or the like after insertion of the insulated wire therein.

More than one wire can be encapsulated at once, and a plurality of wires may be joined by e.g. soldering or welding prior to encapsulation.

Preferably the boot is made of transparent material, and include depth marks thereon to indicate the desired depth of insertion of the wire and the desired depth of fluid substance. Such marks ensure that an adequate depth of encapsulation and depth of the curable substance can be provided in all cases, and checked by external examination. Quality control and reliability are thus improved. The depth marks are preferably on either side of said neck and may be constituted by outward bulges of the boot.

The invention ensures that the likelihood of a gap between the insulated wire and the curable substance is unlikely because of the increased depth of substance around the insulated wire.

In another aspect the invention comprises a method of encapsulating the bare end of an insulated wire, the method comprising the steps of a) forming a tubular boot having a closed end and an open end;

b) filling said boot with a solidifiable fluid substance;

c) inserting said wire into said boot;

d) crimping said boot to define a neck region intermediate the ends thereof; and e) causing said substance to solidify.

Where the boot is transparent and has depth marks, the method may further include the steps of b2) filling said boot to the outermost depth mark; and c2) inserting the wire so that the bare end is inward of the inwardmost depth mark;

d2) crimping said boot intermediate the depth marks.

In an alternative method the crimping step may be prior to insertion of the wire. In another alternative method the solidifiable fluid substance may be filled after insertion of the wires, or after the crimping step.

BRIEF DESCRIPTION OF THE DRAWINGS

Other features of the invention will be apparent from the following description of preferred embodiments shown by way of example only in relation to a wire harness and in the accompanying drawings in which.

DETAILED DESCRIPTION OF THE DRAWINGS

Figure 1:
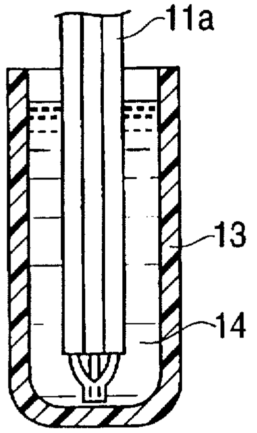
FIG. 1 (PRIOR ART)
FIG. 1 illustrates a correctly applied prior art insulation boot.
Figure 2:
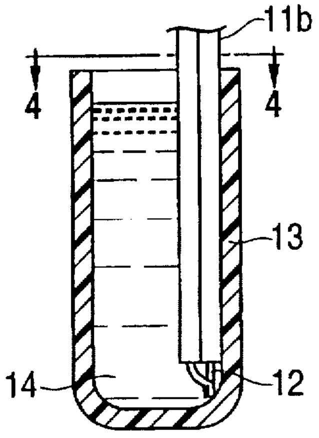
FIG. 2 (PRIOR ART)
FIG. 2 illustrates an incorrectly applied prior art insulation boot.
Figure 3:
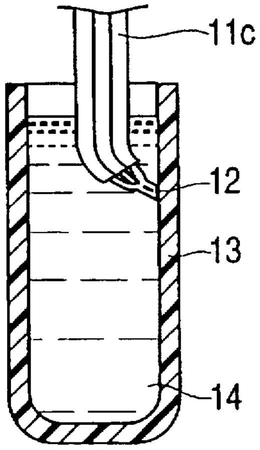
FIG. 3 (PRIOR ART)
FIG. 3 illustrates another incorrectly applied prior art insulation boot.

FIGS. 1–3 are transverse cross sections through prior art insulation boots containing an encapsulation substance such as a biphenyl polychloride.

In FIG. 1 a plurality of insulated electrical wires 11*a* have exposed bare ends 12 which are electrically connected, for example by soldering or welding. A boot 13 of suitable flexible plastics material, such as polyethylene, contains a curable liquid substance 14, such as epoxy resin. Insulated wires 11*a* are inserted into the boot 13, and the resin is cured, for example by the application of heat so that the curable substance 14 becomes solid, and the insulated wires are encapsulated. Such a boot, when correctly applied, has good resistance to current leakage and moisture ingress.

Figure 4:
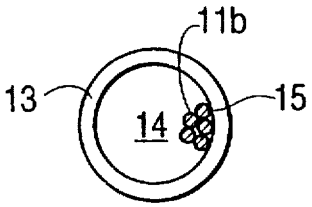
FIG. 4 (PRIOR ART)
FIG. 4 is a cross section of FIG. 2 on line 4—4.

FIG. 2 illustrates an incorrectly applied boot in which the insulated wires 11*b* lie against the sidewall of the boot 13. In this case the wires 11*b* cannot be encapsulated fully because there is too little curable substance between the insulated wires 11*b* and the boot 13; there is a possibility of moisture ingress between the insulated wires 11*b* and the boot, and consequent corrosion. Furthermore external pressure may cause a gap to occur or a small gap to enlarge. FIG. 4 is a cross-section through the boot of FIG. 2 from above and shows a typical moisture channel 15.

FIG. 3 illustrates another incorrectly applied boot. In this case the insulated wires 11*c* are inserted to an insufficient depth and the bare ends are too close to the top of the boot with the possibility that moisture may be able to pass between the substance 13 and the boot 14 to the bare ends 12. Here also external pressure may cause a gap to occur between the boot 14 and the insulated wires 11*c*.

In the case of the boots of FIGS. 2–4, moisture and corrosion can lead to a poor electrical connection, current leakage, and thus unreliability.

Figure 5:
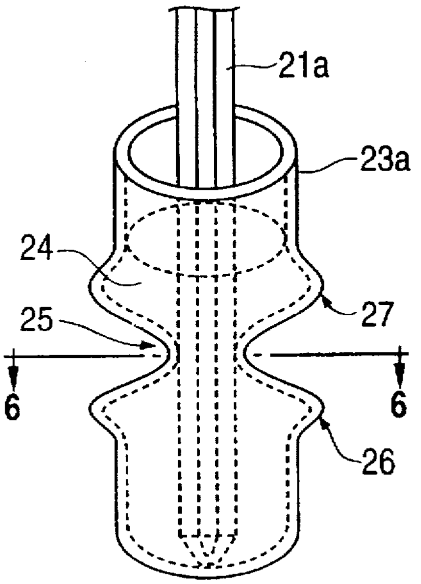
FIG. 5 illustrates a first embodiment of the invention.

FIG. 5 illustrates a first embodiment of the invention. Insulated wires 21*a* are joined electrically at their bare ends 22 by soldering, welding or the like. A flexible boot 23*a* contains a curable liquid substance 24, also as previously described. The boot 23 has a neck 25 defining a narrow internal diameter on either side of which the internal diameter of the boot is much greater.

The wires are inserted into the boot and a retained centrally by the neck 25 as illustrated. The portion above and below the neck permits the substance 24 to surround and fully encapsulate the wires, and thus avoid the prior art problem illustrated in FIG. 2.

As illustrated the boot 23*a* also has outward bulges 26,27 on either side of the neck. These bulges are optional, but provide convenient depth markings which are useful if the boot is made of transparent material. The lower bulge 26 can indicate to an operator the minimum depth of insertion of the wires 21*a*, whilst the upper bulge 27 can indicate the minimum depth of substance 24. In this way the prior art problem illustrated in FIG. 3 can be avoided.

Depth markings can be provided on a transparent boot in any convenient manner, for example by an external printed line or horizontal rib or recess.

The neck 25 may be formed before or after insertion of the wires 21*a* and substance 24. The latter may be preferable in the case where the substance is rather viscous.

Figure 6:
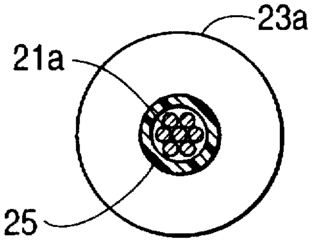
FIG. 6 is a cross-section on line 6—6 of FIG. 5.
Figure 7:
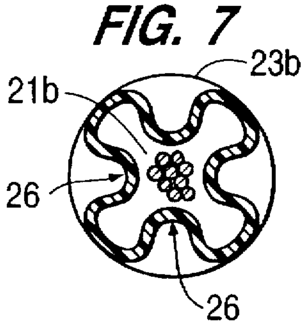
FIG. 7 is a cross-section through an alternative boot which corresponds to FIG. 6.

The neck may comprise an inward deflection of the wall of the boot around the entire circumference thereof as illustrated in FIG. 6, or may be constituted by several separate indentations 26 of the boot 23*b*, as illustrated in FIG. 7, which are sufficient to maintain the wires 21*b* in the centre of the boot.

Figure 8:
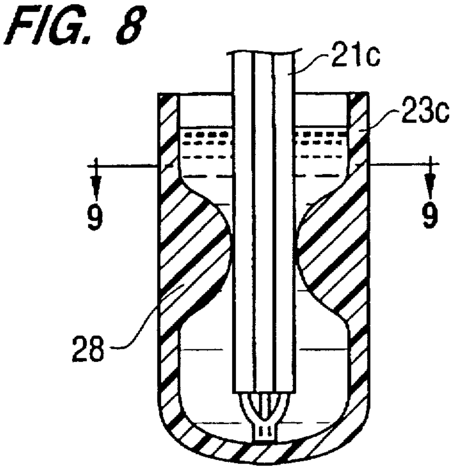
FIG. 8 is a longitudinal section through another boot according to the invention.
Figure 9:
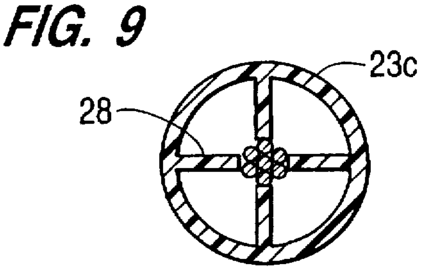
FIG. 9 is a cross-section on line 9—9 of FIG. 8.
Figure 10:
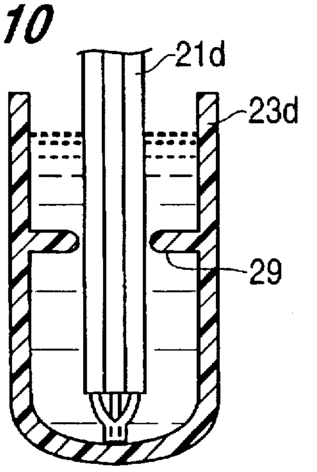
FIG. 10 is a longitudinal cross-section through yet another boot according to the invention.

A boot could be moulded with suitable internal projections or ribs such as those illustrated in FIGS. 8–10. FIGS. 8 and 9 illustrate a plurality of internal ribs 28 integrally moulded in the boot 23*c* and sufficient in number to maintain the wires 21*c* centrally in the boot. FIG. 10 illustrates alternative spokes 29 moulded integrally in the wall of the boot 23*d* and which maintain the wires 21*d* centrally.

Figure 11:
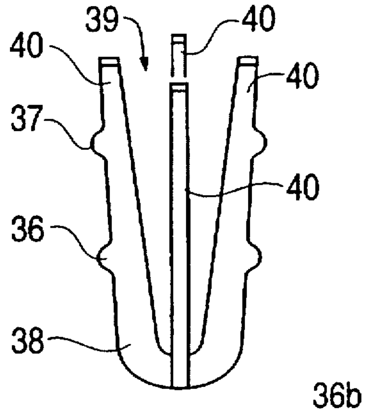
FIG. 11 illustrates a rigid insert for use with the invention.
Figure 12:
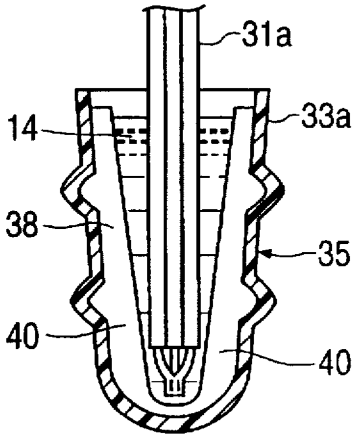
FIG. 12 is a cross-section through a boot incorporating the insert of FIG. 11.

FIGS. 11 and 12 illustrate another embodiment of the invention in which a moulded insert 38 of relatively rigid plastics material is inserted into a stretchable resilient boot 31 to define a neck 35 between lower and upper bulges.

The insert 38 is in the form of a rigid four-armed cross with a central opening 39 to receive the wires 31*a*. Each arm 40 of the cross has lower and upper projections 36,37, and the arms 40 are of sufficient width to define a desired encapsulation depth. Additional inwardly directed bulges may be provided on each arm, in the manner for example of the inward ribs 28 of FIG. 8.

FIG. 12 illustrates the boot with the rigid insert 38 placed inside. The substance 14 surrounds and encapsulates the wires 31*a*, and extends from the wires to the inner wall of the boot except in those places where the arms 40 are located. The bulges 36,37 may constitute depth markings as previously described.

Figure 13:
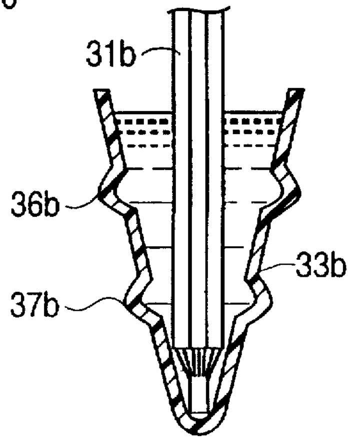
FIG. 13 is a cross-section through another boot according to the invention

FIG. 13 illustrates a further embodiment of the present invention, where the boot 33*b* is formed in such a manner that the width of the closed end is narrower than the open end and its cross-section presents more or less a triangular shape. When the insulated electrical wire 31*b* is inserted from the open end of the boot 33*b*, it is positioned in the centre of the boot 33*b* as it approaches the closed end. The bulges 36*b* and 37*b* may also be used as depth marks as described above.

Other embodiments of the invention are practicable within the scope of the claims defined herewith.

We claim:

1. A boot for waterproofing and insulating a bare end of insulated wire, the boot being adapted to receive a fluid substance into which the bare end of the wire is encapsulated and comprising an elongate tubular sheath of transparent material closed at one end and having an opening at the other end, the sheath further having a side wall, an internal diameter and an external diameter, the boot having a neck sized to receive the wire intermediate the ends with a cavity between the neck and the closed end for receiving the bare end of the wire, the neck being defined by inward depression of the side wall of the sheath wherein the internal and external diameters of the sheath are smallest at the neck, and wherein further the side wall bulges outwardly on each side of the neck, wherein the bulge between said open end and said neck constitutes a fluid depth indicator to indicate the minimum volume of fluid substance to be fed into the sheath, and wherein the bulge between said neck and said closed end constitutes a wire depth indicator to indicate the minimum insertion depth for the wire into the sheath.

2. A boot according to claim 1 wherein said neck is defined by a plurality of circumferentially spaced inward depressions of the side wall of the sheath.

3. A boot according to claim 2 and having a wire or wires encapsulated therein.

4. A boot according to claim 1 and having a wire or wires encapsulated therein.

* * * * *